United States Patent
Li et al.

(10) Patent No.: US 10,843,144 B2
(45) Date of Patent: Nov. 24, 2020

(54) PROCESS FOR PRODUCTION OF ELASTOMER AGGLOMERATE COMPOSITION, ELASTOMER AGGLOMERATE COMPOSITION AND ITS USE

(71) Applicant: SABIC GLOBAL TECHNOLOGIES B.V., Bergen Op Zoom (NL)

(72) Inventors: Dejin Li, Geleen (NL); Mark Erik Nelson, Geleen (NL); Dane Ferraris, Geleen (NL); Vern Lowry, Geleen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/652,266

(22) PCT Filed: Oct. 12, 2018

(86) PCT No.: PCT/EP2018/077887
§ 371 (c)(1),
(2) Date: Mar. 30, 2020

(87) PCT Pub. No.: WO2019/073042
PCT Pub. Date: Apr. 18, 2019

(65) Prior Publication Data
US 2020/0238232 A1    Jul. 30, 2020

(30) Foreign Application Priority Data
Oct. 13, 2017   (EP) .................................. 17196279

(51) Int. Cl.
*C08C 1/07*       (2006.01)
*B01F 5/06*       (2006.01)
*B01F 3/12*       (2006.01)
*B01F 3/08*       (2006.01)

(52) U.S. Cl.
CPC ............ *B01F 5/068* (2013.01); *B01F 3/0811* (2013.01); *B01F 3/1214* (2013.01);
(Continued)

(58) Field of Classification Search
CPC .......... B01F 5/068; B01F 5/0681; B01F 5/08; B01F 3/0811; B01F 2003/0846;
(Continued)

(56) References Cited

U.S. PATENT DOCUMENTS 2,304,689 A * 12/1942 Hanson ................ A01J 11/16
                                                        138/42
2,817,500 A    12/1957 Robinson
(Continued)

FOREIGN PATENT DOCUMENTS

| EP | 0601329 | 6/1994 |
| GB | 755130 | 8/1956 |
| WO | 02081068 A1 | 10/2002 |

OTHER PUBLICATIONS

International Search Report; International Application No. PCT/EP2018/077887; International Filing Date: Oct. 12, 2018; dated Jan. 25, 2019; 5 pages.
(Continued)

*Primary Examiner* — Robert C Boyle
(74) *Attorney, Agent, or Firm* — Cantor Colburn LLP

(57) ABSTRACT

The invention relates to a process for the production of an elastomer agglomerate composition, comprising: forcing a slurry through an aperture in a valve assembly (1) to obtain the elastomer agglomerate composition; wherein the valve assembly (1) comprises the valve (2) and a seat (3) that are arranged opposite each other to provide a flow channel for the slurry to be homogenized with an emulsifying channel section (5) that is provided with the aperture; wherein the emulsifying flow channel section is arranged at an angle (a)
(Continued)

with respect to an axial center line of the valve in a cross sectional view of the valve assembly; and wherein the slurry comprises elastomeric particles in water.

19 Claims, 3 Drawing Sheets

(52) U.S. Cl.
CPC .......... *B01F 5/0663* (2013.01); *B01F 5/0665* (2013.01); *C08C 1/07* (2013.01); *B01F 2215/0049* (2013.01)

(58) Field of Classification Search
CPC ............ B01F 3/1214; B01F 2003/1257; B01F 5/0663; B01F 5/0665; C08C 1/02
See application file for complete search history.

(56) References Cited

U.S. PATENT DOCUMENTS

| | | | |
|---|---|---|---|
| 2,914,086 A * | 11/1959 | Beller | ................... F16K 31/408 55/309 |
| 3,573,246 A | 3/1971 | Bennett | |
| 4,135,829 A * | 1/1979 | Grillo | ..................... B01F 5/068 138/42 |
| 4,265,939 A * | 5/1981 | Tebbens | .................... C08C 1/14 427/222 |
| 4,333,729 A * | 6/1982 | Marugg | ................ B01F 5/0665 366/267 |
| 4,375,497 A * | 3/1983 | Sandstrom | ............... C08J 3/124 427/222 |
| 5,395,569 A | 3/1995 | Badertscher et al. | |
| 6,080,803 A * | 6/2000 | Claassen | ................... C08C 1/07 523/335 |
| 6,784,253 B2 | 8/2004 | Vilasagar et al. | |

OTHER PUBLICATIONS

Written Opinion; International Application No. PCT/EP2018/077887; International Filing Date: Oct. 12, 2018; dated Jan. 25, 2019; 7 pages.

\* cited by examiner

PROCESS FOR PRODUCTION OF ELASTOMER AGGLOMERATE COMPOSITION, ELASTOMER AGGLOMERATE COMPOSITION AND ITS USE

CROSS REFERENCE TO RELATED APPLICATIONS

This application is a 371 of International Application No. PCT/EP2018/077887, filed Oct. 12, 2018, which is incorporated by reference in its entirety, and which claims priority to European Application Serial No. 17196279.8, filed Oct. 13, 2017.

The present invention relates to a valve assembly for use in a process for the production of an elastomer agglomerate composition and the process using such valve. The invention also relates to such elastomer agglomerate composition obtained thereby. The invention further relates to thermoplastic copolymers produced using such elastomer agglomerate composition.

In the field of thermoplastic copolymers, certain copolymers comprising one or more elastomeric phase(s) and one or more thermoplastic phase(s) are known to have significant commercial and technical value. The presence of such multiple phases provides a means for introduction of desirable properties of the materials present in each of the phases into a single polymeric system. Such copolymers may have a very desirable balance of properties, rendering them useful for conversion into a wide variety of applications. For example, such copolymers may exhibit a desirable balance of material properties such as: mechanical properties, including a desirable impact strength, tensile strength and flexural modulus; thermal properties such as heat deflection temperature; processing properties such as mouldability via injection moulding; and optical properties such as surface gloss and scratch resistance.

Such copolymers comprising one or more elastomeric phase(s) and one or more thermoplastic phase(s) may for example be core-shell copolymers. In the context of the present invention, core-shell copolymers may be understood to be copolymers comprising elastomeric particles dispersed in a matrix of a thermoplastic material, in particular copolymers comprising elastomeric particles dispersed in a matrix of a thermoplastic material where a certain portion of the thermoplastic material is chemically bound to the surface of the elastomeric particles.

Such core-shell copolymers may for example be produced by reacting certain elastomeric particles with certain monomers, in which the monomers both react to form a thermoplastic material as well as react with the elastomeric particles to form polymeric structures of the thermoplastic material that are chemically bound to the elastomeric particles. This ensures that the thermoplastic material forming a thermoplastic phase is compatible with the elastomeric phase. Such compatibility may be understood as to allow for melt processing without phase separation of the elastomeric phase(s) and the thermoplastic phase(s) taking place.

A well-known type of a core-shell copolymers that may be produced using elastomeric particles according to the present invention are acrylonitrile-butadiene-styrene copolymers, further also referred to as ABS copolymers. Such ABS copolymers may be produced by for example emulsion polymerisation processes where polybutadiene particles act as the elastomeric particles, which may react with a mixture comprising monomers including styrene and acrylonitrile to form an ABS copolymer.

Other examples of such core-shell copolymers include methacrylate butadiene styrene copolymers, acrylonitrile styrene butylacrylate copolymers, and styrene butylacrylate copolymers.

In order to achieve the desired balance of material properties of such core-shell copolymers, it is desirable that the elastomeric particles that are used in the production process of the core-shell copolymers have a certain average particle size. However, the processes for production of elastomers, such as for example polybutadiene, poly(styrene-butadiene), poly(acrylonitrile butadiene) and poly (butyl acrylate) commonly result in elastomeric particles having an average particle size that is below such desired average particle size.

Therefore, in order to obtain the elastomeric particles having the desirable average particle size for use in the production of core-shell copolymers such as ABS copolymers, there is a need to modify the elastomeric particles obtained from the processes for production of such elastomeric particles in a way that the average particle size is increased.

There are several known methods of increasing the average particle size of such elastomeric particles. For example, the elastomeric particles may be subjected to a further polymerisation step using the monomer(s) that were used to form the initial elastomeric particles. This is known as the direct-growth approach. A disadvantage of this method is that the polymerisation time that is required to produce elastomeric particles having the desired average particle size for use in the production of core-shell copolymers according to the present invention is significantly longer.

A further method is by chemical agglomeration, such as by reacting the initial elastomeric particles with a chemical, for example acrylic acid, to produce chemically agglomerated elastomeric particles. However, a disadvantage of this method is that it may introduce impurities that may affect the final properties of the core-shell copolymers.

A third method to achieve elastomeric particles having a desired average particle size is by way of pressure agglomeration, wherein the initial elastomeric particles are subjected to a pressure of such nature that particles fuse to form an elastomeric agglomerate composition. Such method can be relatively fast, and does not introduce any further impurities into the elastomeric particles. It is therefore a desirable method to increase the average particle size of elastomeric particles, particularly for the purpose of providing elastomeric particles suitable for use in the production of core-shell copolymers according to the present invention, such as ABS copolymers.

A disadvantage of the pressure agglomeration method however is that the average particle size of the elastomer agglomerates that are obtained using such pressure agglomeration method is difficult to control.

U.S. Pat. No. 3,573,246 describes a method of increasing the average particle size of a synthetic rubber latex by pressure agglomeration as it flows through a zone of restriction. In this case the agglomeration is preceded by the addition of a reinforcing agent. The resin dispersions that are employed as reinforcing agents are compatible with the latex dispersions to be agglomerated and, like the silica, act not as chemical agglomerants but solely to achieve greater hardness and compressive strength in the moldings that are produced from the resulting latex foams. The reinforcing agent is a homopolymer of styrene or a copolymer of a minor proportion of butadiene and a major proportion of styrene.

GB755130 describes valves for homogenizing and emulsifying creams. Fluids are forced by means of a pump, under high pressure, through a bore in a nozzle having on its exterior a surface formed with a series of concentric or eccentric ribs with which is associated a movable member having a surface of complemental ribs interfitting and resiliently pressing in the first series and between which the fluid issuing from the bore is forced.

WO02/081068 is directed to a mixer (1) for generating, by mixing water and oil, mixed liquid of water and oil injected, for example, onto the roll (R) of a hot rolling mill, comprising a restriction part formed in a flow passage allowing water to flow therethrough, a valve element capable of forming a ring-shaped clearance in the clearance thereof from the restriction part, an adjusting means for adjusting the size of the clearance, and an oil feed passage for feeding oil to the water flowing through the flow passage, whereby, by adjusting the size of the clearance, a proper mixing level for the different types of lubricating oils with different viscosities can be provided.

U.S. Pat. No. 4,135,829 (A) is directed to a plurality of identical cell rupture valve assemblies are connected in tandem to produce increased homogenization effectiveness. Also, a method of producing increased homogenization effectiveness comprises the steps of, introducing a product to be homogenized to a valve seat of a first cell rupture valve assembly; removing the homogenized product from the output of the valve seat of the first valve assembly; introducing the homogenized product to a valve seat of a second cell rupture valve assembly; and removing the homogenized product from the output of the valve seat of the second valve assembly.

U.S. Pat. No. 2,817,500 is directed an adjustable orifice homogenizer. Disclosed therein is that the position of the valve plug maybe variously adjusted for purposes of maintaining a predetermined pressure-drop across the apparatus.

U.S. Pat. No. 5,395,569 discloses an arrangement for treating a fluid food product by injection of steam which would enable the throughput of steam introduced into the arrangement to be varied without the installation having to be modified by changing the nozzle and hence without the process having to be interrupted.

U.S. Pat. No. 6,080,803 discloses a process for preparing a coarse polymer dispersion, which employs a combination of chemical agglomeration and pressure agglomeration. The chemical agglomeration is carried out using an agglomerant such as polyethylene glycol. The amount of chemical agglomerants is from about 0.01 to 5 wt %. The temperature in the course of agglomeration is generally in a range from about 10 to 70° C., preferably from 20 to 50° C.

It is an objective of the present invention to provide a process for the production of an elastomer agglomerate composition and a valve for use in such process, in which the above-mentioned and/or other problems are solved.

Figure 1A:
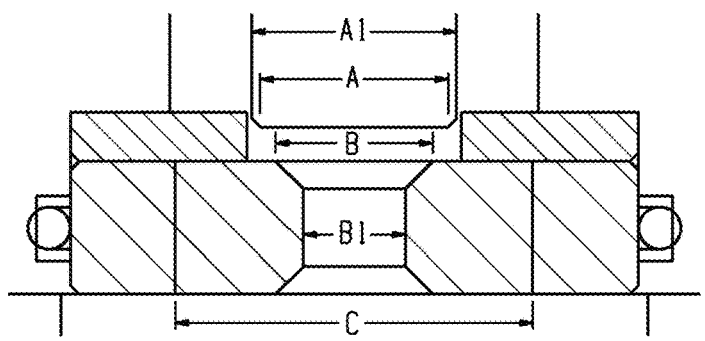
FIG. 1A is a cross sectional view of a valve assembly with a flat valve.

Accordingly, the present invention provides a valve assembly comprising a valve and a seat that are arranged opposite each other to provide a flow channel for a fluid to be homogenized with an emulsifying flow channel section, wherein the emulsifying flow channel section is arranged at a sharp angle with respect to an axial center line of the valve in a cross sectional view of the valve assembly. The present invention further provides a high-pressure homogenizer comprising such valve assembly.

The present invention further provides a process for the production of an elastomer agglomerate composition, comprising the steps of:

a) providing a slurry comprising elastomeric particles in water; and b) forcing the slurry through an aperture to obtain the elastomer agglomerate composition, wherein step b) is performed using the valve assembly according to the invention, wherein the slurry is the fluid to be homogenized and the emulsifying flow channel section is provided with the aperture.

The present invention is based on the finding that the shape of the aperture through which the slurry is passed has a significant influence on the controllability of the particle size distribution of the obtained agglomerate composition.

The process according to the invention is generally performed in a high-pressure homogenizer comprising the valve assembly. The common design of the valve assembly for a high-pressure homogenizer is a set of flat surface discs stacked together in parallel. The slurry flows through the gap between these discs under shear by the high pressure applied to the slurry.

At a fixed feed rate of the slurry, decreasing the gap between the discs in the valve causes the increase in the pressure. It is expected that this causes the shear stress applied to the slurry passing the gap to increase and a higher proportion of large particles is expected. However, the inventors observed that the valve assembly having parallel flat discs did not show such performance. The increase in the pressure did not always lead to larger particles, but sometimes to a smaller particle size. This makes it very difficult to control the particle size distribution in a predictable manner.

The present inventors have found that a valve assembly with a specific shape leads to a predictable relationship between the pressure and the particle size distribution, which allows an easier control of the particle size distribution. When the valve according to the invention is used, the increase in the pressure leads to a larger average particle size.

Preferably, the flow channel has a Y-shaped cross section.

Preferably, the valve has a cone-shaped surface that is directed towards the seat.

Preferably, the emulsifying channel section has a first width, as seen in a direction perpendicular to a flow of the fluid to be homogenized, that is adjustable by moving the valve and the seat with respect to each other.

Preferably, the flow channel has an inlet flow channel section having a second width, as seen in the direction perpendicular to the flow of the fluid to be homogenized, that is larger than the first width.

The angle of the emulsifying flow channel section with respect to the axial center line of the valve is less than 90°, for example less than 85°, 10° to 80°, 20° to 70°, 30° to 60°, 40° to 50°.

Figure 1B:
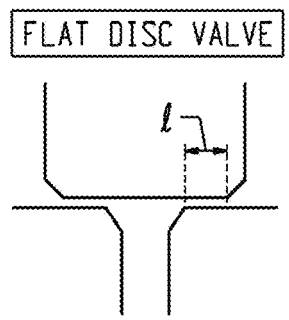
FIG. 1B is an exploded view of the valve assembly of FIG. 1A.

FIG. 1 schematically illustrates an example of a valve assembly which is not according to the invention.

Figure 2A:
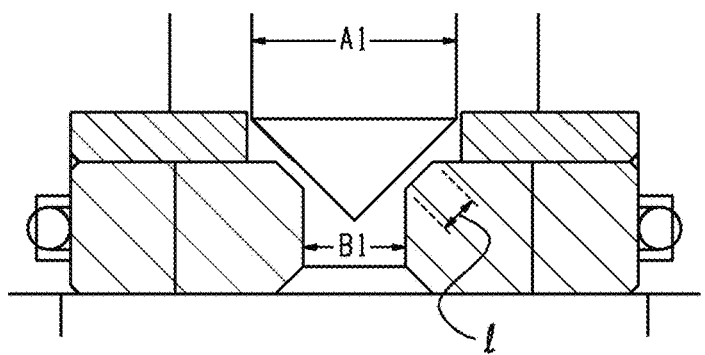
FIG. 2A is a cross sectional view of an exemplary, non-limiting embodiment of a valve assembly with a cone valve.
Figure 2B:
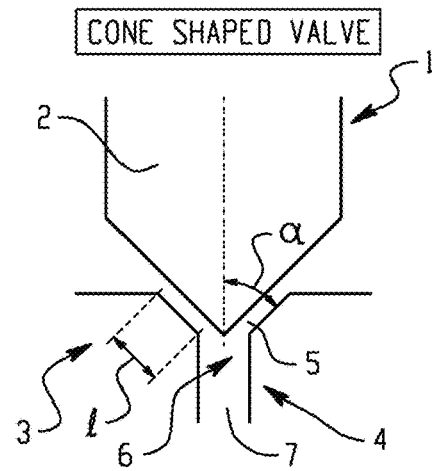
FIG. 2B is an exploded view of the valve assembly of FIG. 2A.

FIG. 2 shows a cross sectional view of an exemplary, non-limiting embodiment of a valve assembly 1 that may be used in certain embodiments of the present invention. The valve assembly 1 comprises a valve 2 and a seat 3 that are arranged opposite each other to provide a flow channel 4 for the slurry with an emulsifying flow channel section 5 that is provided with the aperture 6. The emulsifying flow channel section 5 is arranged at a sharp angle α with respect to an axial center line of the valve 2. FIG. 2 shows that the flow channel 4 of the exemplary embodiment of the valve assembly 1 has a Y-shaped cross section. The valve 2 of the valve assembly 1 has a cone-shaped surface that is directed towards the seat 3 to provide the flow channel 4 with the emulsifying flow channel section 5. In use of the valve assembly 1, the slurry enters the emulsifying flow channel section 5 via the aperture 6. The emulsifying flow channel section 5 has a first width, as seen in a direction perpendicular to a flow of the slurry. The first width is adjustable by moving the valve 2 and the seat 3 with respect to each other. The flow channel 4 has an inlet flow channel section 7 that has a second width, as seen in the direction perpendicular to the flow of the slurry. When the valve assembly 1 is in use the second width is larger than the first width.

In this embodiment of FIG. 2, the valve diameter A1 was 6.84 mm, the inner bore diameter B1 of the seat was 1.8 mm and the length of the emulsifying flow channel section 1 was 2 mm.

FIG. 1 is similar to FIG. 2, but the emulsifying flow channel section that is provided with the aperture is arranged at 90° with respect to an axial center line of the valve.

In this embodiment of FIG. 1, the valve diameter A1 was 6.84 mm, the inner bore diameter B1 of the seat was 1.8 mm and the length of the emulsifying flow channel section was 0.465 mm. The valve tapered end diameter A was 4.97 mm and the inner bore tapered end diameter was 4.04 mm.

The average particle size and the particle size distribution of the elastomeric particles in the slurry or of the elastomer agglomerates in the elastomer agglomerate composition may be determined. In the context of the present invention, the average particle size is understood to be the $D_{50}$ particle size as determined in accordance with ISO 9276-2:2014. The particle size distribution is determined by a Beckman Coulter multi-wavelength laser diffraction particle size analyser type LS 13320 in accordance with ISO 13320.

Step (a)
Slurry

The elastomeric particles used in the process of the present invention may for example be selected from the group consisting of polybutadiene particles, poly(styrene butadiene) particles, poly(acrylonitrile butadiene) particles and polybutylacrylate particles and combinations thereof. Preferably, the poly(styrene butadiene) particles comprise at least 50 wt %, at least 60 wt %, at least 70 wt %, at least 80 wt % or at least 90 wt % of units derived from butadiene.

Preferably, the elastomeric particles used in the process of the present invention are selected from the group consisting of polybutadiene particles, poly(styrene butadiene) particles comprising at least 50 wt % of units derived from butadiene, poly(acrylonitrile butadiene) particles and polybutylacrylate particles and combinations thereof. When the elastomeric particles comprise poly(styrene butadiene) particles, the poly(styrene butadiene) particles preferably comprise at least 60 wt %, at least 70 wt %, at least 80 wt % or at least 90 wt % of units derived from butadiene.

Preferably, the elastomeric particles are polybutadiene particles.

The elastomeric particles in the slurry (i.e., the unhomogenized particles) have an average particle size, $D_{50}$, prior to homogenization, e.g., an original $D_{50}$. The elastomeric particles preferably have an average particle size of at most 150 nm, more preferably at most 130 nm or even more preferably at most 120 nm, for example 80 to 120 nm. Use of such elastomeric particles has an advantage in that the need for lengthy polymerisation of the monomers to obtain the elastomeric particles is avoided.

The particle size distribution of the elastomeric particles is not critical, but typically the volume fraction of particles with particle size smaller than 214 nm in the slurry is at least 90%.

The slurry that is used in the process according to the present invention may comprise at least 20 wt % of elastomeric particles, preferably at least 20 wt % and at most 70 wt %, more preferably at least 30 wt % and at most 60 wt %, even more preferably at least 30 wt % and at most 50 wt %, with regard to the total weight of the slurry.

Preferably, the slurry that is used in the process according to the present invention comprises at least 20 wt % of elastomeric particles, preferably at least 20 wt % and at most 70 wt %, more preferably at least 30 wt % and at most 60 wt %, even more preferably at least 30 wt % and at most 50 wt %, with regard to the total weight of the slurry, wherein the elastomeric particles consist of polybutadiene particles.

The slurry is preferably an aqueous emulsion. The slurry may further comprise an emulsifier for ensuring the slurry to be in the form of an aqueous emulsion. Such aqueous emulsion may also be referred to as a latex. For the avoidance of doubt, an emulsifier is herein not considered as a chemical agglomerant.

The amount of the emulsifier may e.g. be 0.05 to 15% wt %, preferably 0.1 to 10 wt %, 0.2 to 5 wt % or 0.5 to 3 wt %, with respect to the elastomeric particles.

Suitable emulsifiers are those emulsifiers which are known to the skilled worker and are commonly employed as dispersants in the context of aqueous emulsion polymerization; such emulsifiers are described, for example, in Houben-Weyl, Methoden der organischen Chemie, Volume XIV/1, Makromolekulare Stoffe [Macromolecular substances], Georg-Thieme-Verlag, Stuttgart, 1961, pp. 411-420. Anionic, cationic and nonionic emulsifiers are suitable. Preference is given to using anionic emulsifiers, and especially soaps.

Suitable anionic emulsifiers E are the salts of C8-C18 fatty acids with alkali metals, such as Na and K, with ammonium, with volatile amines, such as triethylamine ethanolamine, diethanolamine, triethanolamine and morpholine, etc., and with divalent and trivalent cations, such as calcium, magnesium, aluminum, etc., for example. Examples of further suitable anionic emulsifiers are alkali metal and ammonium salts of alkyl sulfates (alkyl: C8-C22), of sulfuric monoesters with ethoxylated alkanols (EO units: 2 to 50, alkyl: C12-C18) and ethoxylated alkylphenols (EO units: 3 to 50, alkyl: C4-C9), of alkylsulfonic acids (alkyl: C12-C18) and of alkylarylsulfonic acids (alkyl: C9-C18). Further suitable emulsifiers are given in Houben-Weyl, loc.cit. pp. 192-208).

Preferred emulsifiers are the sodium or potassium soaps of palmitic, margaric, stearic, palmitoleic and oleic acid and the resin soaps (resinates), such as the sodium or potassium salts of ricinoleic, abietic and pimaric acid, etc. Potassium salt of tallow fatty acid or potassium oleate is the preferred emulsifier employed.

In some embodiments, the slurry comprises a chemical agglomerant. The presence of the chemical agglomerant in the slurry promotes larger agglomerates.

In some embodiments, the slurry is substantially free of chemical agglomerants. This avoids impurities that may affect the final properties of the core-shell copolymers made from the elastomer agglomerate composition. In these cases, preferably the amount of the chemical agglomerants being less than 0.01 wt % with respect to the total of the solids content in the slurry and any chemical agglomerants.

The term "chemical agglomerant" is herein meant as generally water-soluble or water-dispersible polymers based on hydrophilic monomers, such as polyacrylamide, polymethacrylamide, polyvinyl esters of C1-C18 carboxylic acids, examples being polyvinyl formate, polyvinyl acetate, polyvinyl propionate, polyvinyl n-butyrate, polyvinyl laurate and polyvinyl stearate, polyethers, such as polyalkylene glycols, and combinations thereof.

Slurry Temperature

The slurry provided in step (a) to be forced through an aperture in step (b) may have a temperature of more than 0° C. and less than 100° C., typically 10 to 90° C.

Preferably, the slurry provided in step (a) to be forced through an aperture in step (b) has a temperature of 40 to 80° C., preferably 45 to 80° C., more preferably 50 to 70° C.

The use of a slurry having such a relatively high temperature provides a pressure agglomeration method with a desirable particle size distribution which avoids the use of chemical agglomerants and impurities that may affect the final properties of the core-shell copolymers made from the elastomer agglomerate composition. It was surprisingly found that the use of a slurry having a temperature of 40 to 80° C. allows a broad operating window of the process for obtaining a elastomer agglomerate composition with a desirable particle size distribution.

Step b)

In step (b), the slurry comprising the elastomer particles is forced through an aperture. By going through the aperture, the elastomer particles agglomerate to provide a elastomer agglomerate composition comprising elastomer agglomerates.

The aperture is comprised in a flow channel for the slurry provided by a valve and a seat that are arranged opposite each other of a valve assembly. The aperture is arranged at a sharp angle with respect to an axial center line of the valve in a cross sectional view of the valve assembly The slurry is forced through the aperture at a certain pressure. For example, the slurry may be forced through the aperture at a pressure of at least 400 bar, for example at least 500 bar, at least 600 bar, at least 700 bar or at least 800 bar. Particularly preferably, the slurry is forced through the aperture at a pressure of at least 850 bar, for example 850 to 1000 bar.

The slurry may be forced through the aperture at a flow velocity of at least 3 m/s, for example 5 to 15 m/s Preferably, the slurry is forced through the aperture at a flow velocity of at least 500 m/s, more preferably at least 600 m/s, more preferably at least 700 m/s, such as at least 700 m/s and at most 1000 m/s.

Elastomer Agglomerate Composition

In order to achieve balanced flow/impact and other properties of the final core-shell copolymer, it is desired that the elastomer agglomerate composition has a relatively small portion of very small particles (e.g., underhomogenized portion) and a relatively small portion of very large particles (e.g., overhomogenized portion). The underhomogenized portion refers to that portion of the original particles that did not agglomerate. For example, referring to FIG. 3, line 1 illustrates the unhomogenized elastomeric particles (e.g., the original particles in the slurry). All of the unhomogenized elastomeric particles have a size of less than 200 nm. Hence the underhomogenized particles are considered to be those having a size of less than 200 nm. The overhomogenized portion refers to the portion of the homogenized particles that have a size of greater than or equal to ten (preferably nine, more preferably eight) times the average particle size of the unhomogenized particles:

overhomogenized portion=10($D_{50}$ of unhomogenized particles)

Figure 3:
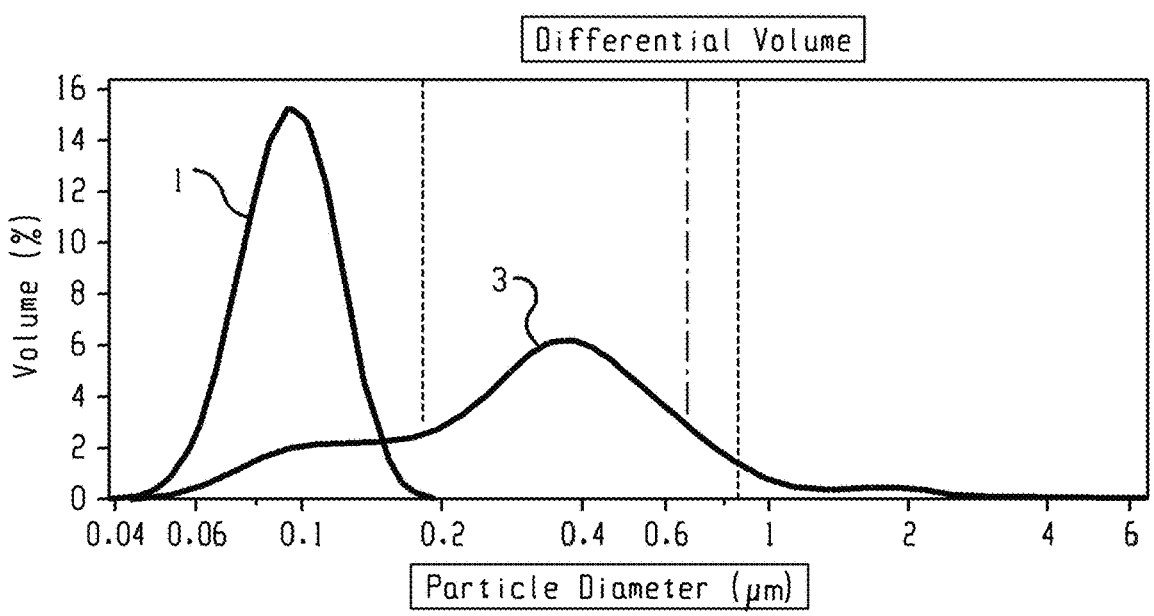
FIG. 3 is a graphical representation of particle diameter versus volume percent.

In the example in FIG. 3, $D_{50}$ of line 1 (the unhomogenized particles) would be 100 nm, with a particle distribution of 40 nm to 200 nm. The underhomogenized particles would have a particle size of at most, 200 nm, and the overhomogenized particles would have a particle size of greater than or equal to 1000 nm, preferably 900 nm.

The elastomer agglomerate composition can have at most 40 vol %, preferably at most 30 vol %) underhomogenized particles, based upon a total volume of the elastomer agglomerate composition.

The elastomer agglomerate composition can have at most 10 vol %, preferably at most 8 vol %) overhomogenized particles, based upon a total volume of the elastomer agglomerate composition.

For example, the volume fraction of particles with particle size smaller than 214 nm in the elastomer agglomerate composition is preferably relatively small. For example, the volume fraction of particles with particle size smaller than 214 nm in the elastomer agglomerate composition is at most 50%, more preferably at most 40%, even more preferably at most 30%, for example 10 to 30% or 20 to 30%. This leads to a better impact strength of the graft copolymer made using the elastomer agglomerate composition. This further improves the processing stability of the graft copolymers.

For example, the volume fraction of particles with particle size larger than 868 nm in the elastomer agglomerate composition is preferably relatively small. For example, the volume fraction of particles with particle size larger than 868 nm in the elastomer agglomerate composition is at most 15%, more preferably at most 10%. This leads to a desirable melt flow of the graft copolymer produced using the elastomer agglomerates. This also avoids detrimental effect to the opacity of the graft copolymer.

In preferred embodiments, the volume fraction of particles with particle size smaller than 214 nm in the elastomer agglomerate composition is 10 to 30% or 20 to 30% and the volume fraction of particles with particle size larger than 868 nm in the elastomer agglomerate composition is at most 10%. Such composition demonstrates a desirable narrow particle size distribution that is beneficial for providing the desired material properties to the graft copolymer produced using the elastomer agglomerates, as well as for providing the desired processability properties.

Preferably, the elastomer agglomerates in the elastomer agglomerate composition have an average particle size of at least 150 nm, or at least 250 nm, such as at least 150 and at most 1000 nm or at least 250 and at most 1000 nm. More preferably, the elastomeric particles have an average particle size of at least 200 nm and at most 500 nm, or at least 250 nm and at most 400 nm. Such composition is beneficial for providing the desired material properties to the graft copolymer produced using the elastomer agglomerates, as well as for providing the desired processability properties.

Further Aspects

The elastomer agglomerate composition obtained according to the process of the invention may for example be used in a further polymerisation process, such as in the production of elastomer-reinforced thermoplastic copolymers, such as graft copolymers, via emulsion polymerisation.

The present invention also relates to the elastomer agglomerate composition obtained by or obtainable by the process according the invention.

The present invention also relates to the use of the elastomer agglomerate composition according to the invention in the production of acrylonitrile-butadiene-styrene copolymers, methacrylate butadiene styrene copolymers, acrylonitrile styrene butylacrylate copolymers, or styrene butylacrylate copolymers.

The present invention also relates to acrylonitrile-butadiene-styrene copolymers, methacrylate butadiene styrene copolymers, acrylonitrile styrene butylacrylate copolymers, or styrene butylacrylate copolymers produced using the elastomer agglomerate composition according to the invention.

The present invention also relates to a process for the production of a copolymer selected from the group consisting of acrylonitrile-butadiene-styrene copolymers, methacrylate butadiene styrene copolymers, acrylonitrile styrene butylacrylate copolymers, or styrene butylacrylate copolymers, comprising the process for the production of an elastomer agglomerate composition according to the invention and producing the copolymer from the elastomer agglomerate composition preferably via emulsion polymerization.

Although the below examples are directed to polybutadiene particles, this invention applies to other type of elastomers, i.e. nitrile rubber, styrene-butadiene rubber (SBR), polybutylacrylate rubber, etc. Not to be limited to theory, even though these rubbers have different chemical properties, the interactions between particles are still governed by electrostatic repulsion and van der Waals attraction. Under static conditions, the latex particles in the examples are stabilized or prevented from agglomeration due to electrostatic repulsion from their charged surfaces. This electrostatic surface charge is a result of adsorbed surfactants used in the production of the latex. The homogenizer imparts energy to the latex dispersion thus causing the particles to overcome the energy of repulsion leading to attraction and ultimately agglomeration. Manipulation of the process conditions with different valve configuration or geometry allows the control of the energy dissipation distribution and ultimately the particle size distribution.

The present invention also relates to the copolymer obtained by or obtainable by the process according to the invention for the production of the copolymer.

For example, the elastomer agglomerate composition can be added to a reaction vessel and heated. Styrene can be added to the vessel, allowing an optional pre-soak before the addition of an initiator (e.g., cumene hydroperoxide initiator), optionally over a period of time. Acrylonitrile and styrene feeds can also be added to the reaction vessel, e.g., after the addition of the initiator has started. Optionally, the acrylonitrile and the styrene can also be added over a period of time. An example of polymerization processes are disclosed in U.S. Pat. No. 6,784,253.

In a specific example, an initial charge of a polybutadiene emulsion can be added to a three liter reaction vessel and heated to 57.2° C. Next 12.06 parts by weight of styrene can be added to the reaction vessel as a "pre-soak". After a pre-soak of about 20 minutes an addition of 0.375 parts of cumene hydroperoxide initiator can be started. The initiator can be added to the reaction vessel over a period of 70 minutes. Five minutes after starting the initiator addition, a feed of 12.05 parts of acrylonitrile can be started. The acrylonitrile can be added to the reaction vessel over a period of 65 minutes. Ten minutes after the start of the initiator addition, a feed of 24.09 parts of styrene can be started. The styrene can be added to the reaction vessel over a period of 60 minutes.

It is noted that the invention relates to all possible combinations of features described herein, preferred in particular are those combinations of features that are present in the claims. It will therefore be appreciated that all combinations of features relating to the composition according to the invention; all combinations of features relating to the process according to the invention and all combinations of features relating to the composition according to the invention and features relating to the process according to the invention are described herein.

It is further noted that the term 'comprising' does not exclude the presence of other elements. However, it is also to be understood that a description on a product/composition comprising certain components also discloses a product/composition consisting of these components. The product/composition consisting of these components may be advantageous in that it offers a simpler, more economical process for the preparation of the product/composition. Similarly, it is also to be understood that a description on a process comprising certain steps also discloses a process consisting of these steps. The process consisting of these steps may be advantageous in that it offers a simpler, more economical process.

Unless specified to the contrary herein, all test standards (including ISO, ASTM, etc.) are the most recent standard in effect as of Oct. 12, 2017.

When values are mentioned for a lower limit and an upper limit for a parameter, ranges made by the combinations of the values of the lower limit and the values of the upper limit are also understood to be disclosed.

The invention is now elucidated by way of the following examples, without however being limited thereto.

EXAMPLES

To 13800 g of polybutadiene latex with 38.52 wt % total solids, 292 g of tallow fatty acid potassium salt soap with 10% total solids was added and stirred well. Additional 154 g of DI water was added to obtain a final latex with 37.5 wt % total solids with 0.9 wt % total soap.

The particle size distribution of this slurry was determined by a Beckman Coulter multi-wavelength laser diffraction particle size analyser type LS 13320 according to ISO 13320.

The slurry was fed to a homogenizer at room temperature (23.9° C.). The homogenizer has a valve illustrated in FIG. 1 or FIG. 2, through which the latex was passed to obtain an elastomer agglomerate composition.

The particle size distribution of these elastomer agglomerate compositions was determined by a Beckman Coulter multi-wavelength laser diffraction particle size analyser type LS 1332013320 according to ISO 13320.

Figure 4:
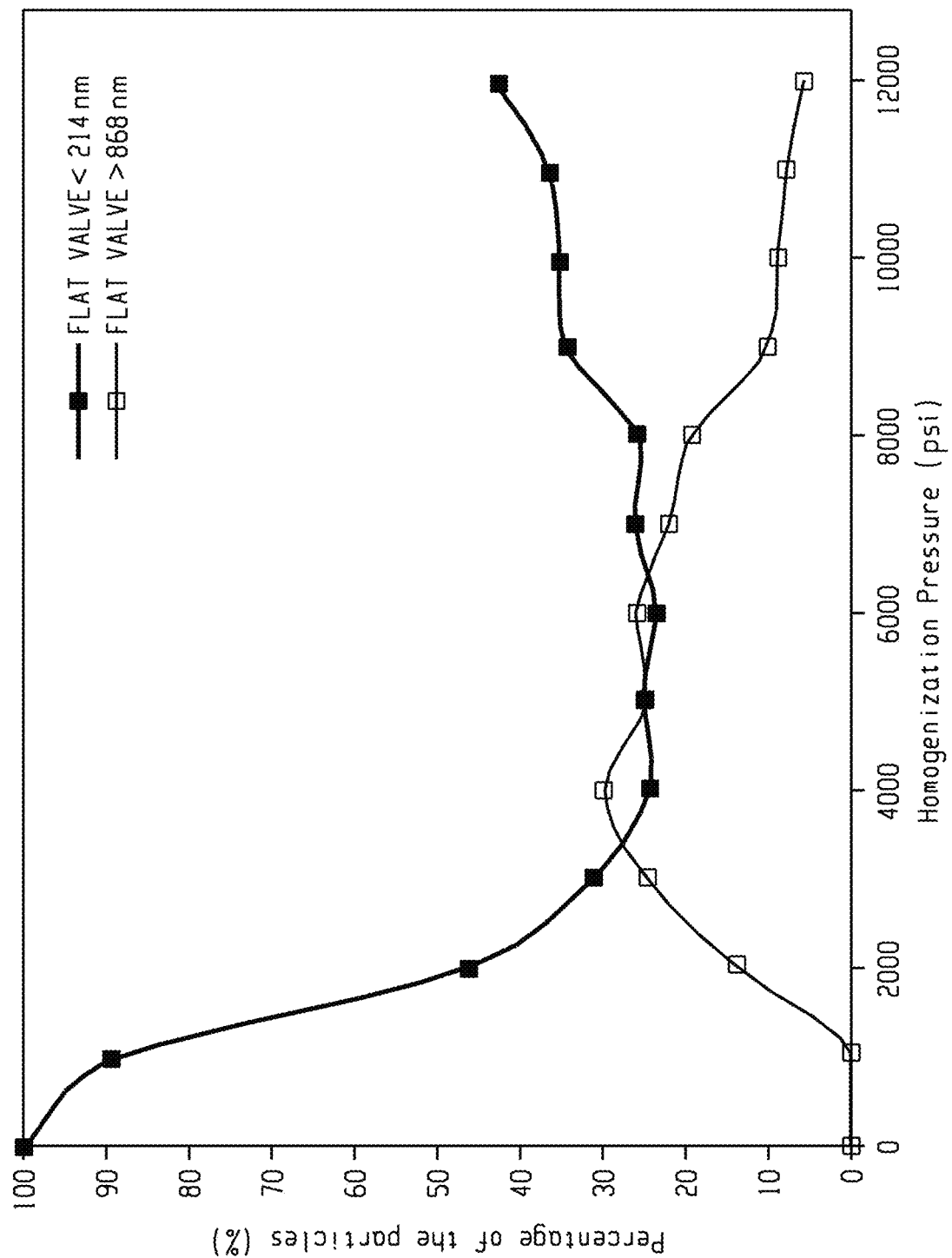
FIG. 4 is a graphical representation homogenization pressure versus percentage of particles when using the valve assembly of FIG. 1.

The volume fraction of particles with particle size smaller than 214 nm (also referred herein as <214 nm portion) and the volume fraction of particles with particle size smaller than larger than 868 nm (also referred herein as >868 nm portion) were monitored against the pressure change of the homogenization process. The results using the valves of FIG. 1 and FIG. 2 are shown in FIG. 4 and FIG. 5, respectively.

When the valve of FIG. 1 was used (FIG. 4), the particle size distribution did not show desirable, consistent results with respect to the pressure. When the homogenization pressure was less than 4000 psi, the <214 nm portion decreased with pressure and the >868 nm portion increased with pressure. The proportions of the <214 nm and the >868 nm portion were generally constant when the pressure was 4000 to 8000 psi. When the pressure was more than 8000 psi, the <214 nm portion increased with pressure and the >868 portion decreased with pressure. This was unexpected and undesirable, making it difficult to control the particle size distribution.

Figure 5:
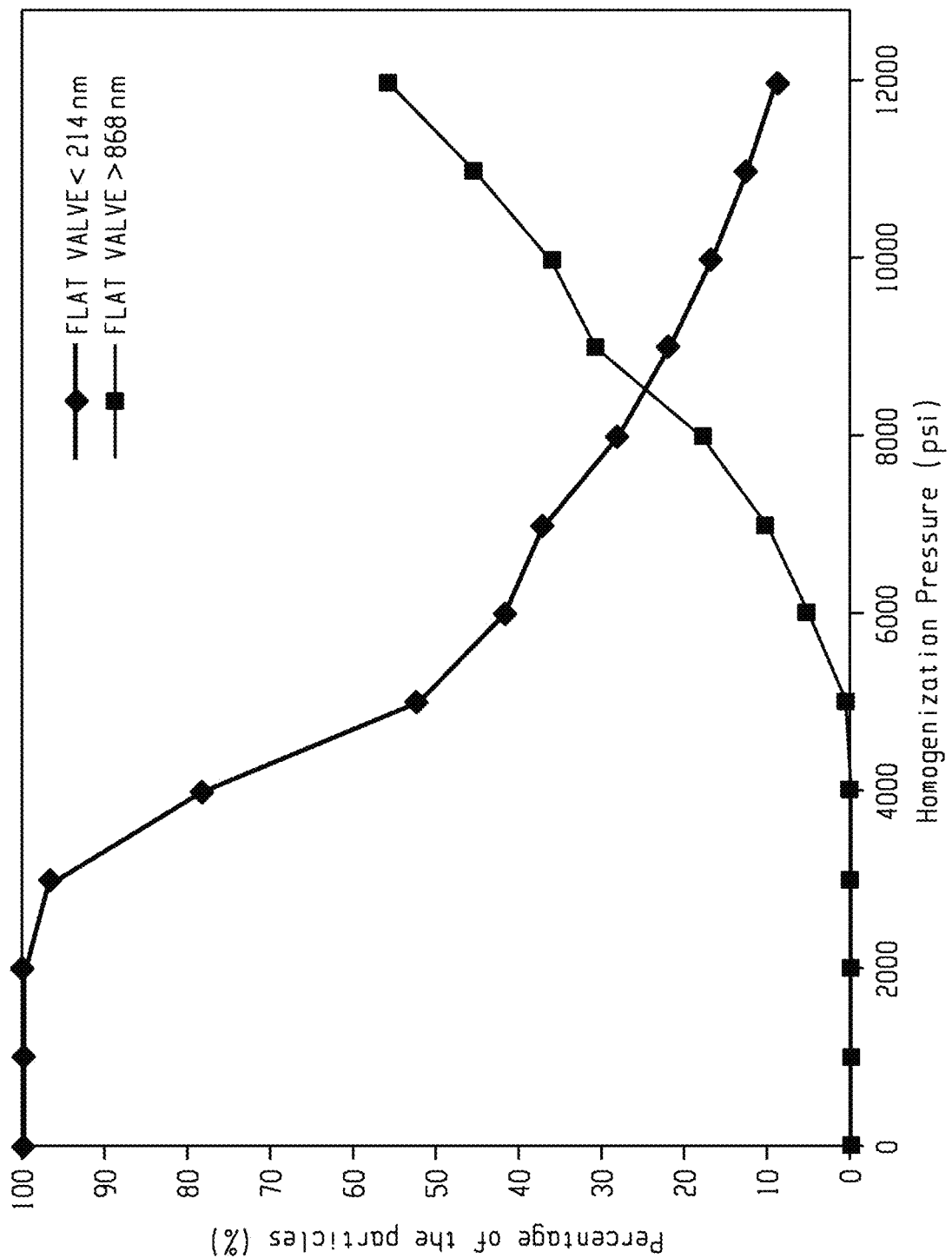
FIG. 5 is a graphical representation homogenization pressure versus percentage of particles when using the valve assembly of FIG. 2.

In contrast, the particle size distribution showed desirable, consistent results with respect to the pressure when the valve of FIG. 2 was used (FIG. 5). Until the homogenization pressure reached 4000 psi, little effect was observed on the proportions of the <214 nm portion and the >868 nm portion. From 4000 psi, the <214 nm portion decreased with pressure and the >868 nm portion increased with pressure. This relationship that the increase in the pressure causes a larger average particle size allows an easier control of the particle size distribution.

Set forth below are some aspects of the valve and process disclosed herein

Aspect 1: A valve assembly comprising a valve and a seat that are arranged opposite each other to provide a flow channel for a fluid to be homogenized with an emulsifying channel section, wherein the emulsifying flow channel section is arranged at a sharp angle with respect to an axial center line of the valve in a cross sectional view of the valve assembly.

Aspect 2: The valve assembly according to aspect 1, wherein the flow channel has a Y-shaped cross section.

Aspect 3: The valve assembly according to any one of the preceding aspects, wherein the valve has a cone-shaped surface that is directed towards the seat.

Aspect 4: The valve assembly according to any one of the preceding aspects, wherein the emulsifying channel section has a first width, as seen in a direction perpendicular to a flow of the fluid to be homogenized, that is adjustable by moving the valve and the seat with respect to each other.

Aspect 5: The valve assembly according to aspect 4, wherein the flow channel has an inlet flow channel section having a second width, as seen in the direction perpendicular to the flow of the fluid to be homogenized, that is larger than the first width.

Aspect 6: A high-pressure homogenizer comprising at least one valve assembly according to any one of aspects 1-5.

Aspect 7: A process for the production of an elastomer agglomerate composition, comprising: (a) providing a slurry comprising elastomeric particles in water; and (b) forcing the slurry through an aperture to obtain the elastomer agglomerate composition; wherein step b) is performed using the valve assembly according to any one of aspects 1-5; and wherein the slurry is the fluid to be homogenized and the emulsifying flow channel section is provided with the aperture.

Aspect 8: A process for the production of an elastomer agglomerate composition, comprising: forcing a slurry through an aperture in a valve assembly to obtain the elastomer agglomerate composition; wherein the valve assembly comprises the valve and a seat that are arranged opposite each other to provide a flow channel for the slurry to be homogenized with an emulsifying channel section that is provided with the aperture; wherein the emulsifying flow channel section is arranged at an angle α (preferably at a sharp angle) with respect to an axial center line of the valve in a cross sectional view of the valve assembly; and wherein the slurry comprises elastomeric particles in water.

Aspect 9: The process according to any one of aspects 7-8, wherein the elastomeric particles are selected from the group consisting of polybutadiene particles, poly(styrene butadiene) particles, poly(acrylonitrile butadiene) particles and polybutylacrylate particles and combinations thereof.

Aspect 10: The process according to any one of aspects 7-9, wherein the elastomeric particles are selected from the group consisting of polybutadiene particles, poly(styrene butadiene) particles comprising at least 50 wt % of units derived from butadiene, poly(acrylonitrile butadiene) particles and polybutylacrylate particles and combinations thereof.

Aspect 11: The process according to any one of aspects 7-10, wherein the elastomeric particles are polybutadiene particles.

Aspect 12: The process according to any one of any one of aspects 7-11, wherein the slurry is substantially free of chemical agglomerants, preferably the amount of the chemical agglomerants being less than 0.01 wt % with respect to the total of the solids content in the slurry and any chemical agglomerants Aspect 13: The process according to any one of any one of aspects 7-12, wherein the slurry has a temperature of 40 to 80° C., preferably 45 to 80° C.4

Aspect 14: The process according to any one of any one of aspects 7-13, wherein the angle α is less than 90°, preferably less than 85°, more preferably 20° to 70°.

Aspect 15: The process according to any one of aspects 7-14, wherein the elastomeric particles in the slurry have an average particle size $D_{50}$, as is determined in accordance with ISO 9276-2:2014; and wherein the elastomer agglomerate composition has at most 40 vol %, preferably at most 30 vol %, underhomogenized portion, and at most 10 vol %, preferably at most 8 vol %, overhomogenized portion, based upon a total volume of the elastomer agglomerate composition.

Aspect 16: The process according to any one of aspects 7-15, wherein the elastomeric particles in the slurry have an average particle size $D_{50}$, as is determined in accordance with ISO 9276-2:2014; and wherein the elastomer agglomerate composition has at most 40 vol %, preferably at most 30 vol %, underhomogenized portion, and at most 10 vol %, preferably at most 8 vol %, overhomogenized portion, based upon a total volume of the elastomer agglomerate composition.

Aspect 17: The process according to Aspect 16, wherein the overhomogenized portion is a portion of the elastomer agglomerate composition that has a particle size of greater than or equal to ten times the average particle size $D_{50}$, preferably nine times the average particle size $D_{50}$, more preferably eight times the average particle size $D_{50}$.

Aspect 18: The process according to any one of Aspects 16-17, wherein the underhomogenized portion is a portion of the elastomer agglomerate composition that has a particle size that is less than or equal to a largest particle size of the elastomeric particles.

Aspect 19: The elastomer agglomerate composition obtained by or obtainable by the process according to any one of Aspects 7-18.

Aspect 20: Use of the elastomer agglomerate composition according to Aspect 19 in the production of acrylonitrile-butadiene-styrene copolymers, methacrylate butadiene styrene copolymers, acrylonitrile styrene butylacrylate copolymers, or styrene butylacrylate copolymers.

Aspect 21: Acrylonitrile-butadiene-styrene copolymers, methacrylate butadiene styrene copolymers, acrylonitrile styrene butylacrylate copolymers, or styrene butylacrylate copolymers produced using the elastomer agglomerate composition according to Aspect 20.

Aspect 22: A method for forming a graft copolymer, comprising: heating the elastomer agglomerate composition according to Aspect 19, and reacting the elastomer agglomerate composition with styrene and acrylonitrile to form the graft copolymer.

The invention claimed is:

1. A process for the production of an elastomer agglomerate composition, comprising:
   forcing a slurry through an aperture in a valve assembly to obtain the elastomer agglomerate composition;
   wherein the valve assembly comprises a valve and a seat that are arranged opposite each other to provide a flow channel for the slurry to be homogenized with an emulsifying channel section that is provided with the aperture;
   wherein the emulsifying flow channel section is arranged at a sharp angle with respect to an axial center line of the valve in a cross sectional view of the valve assembly; and
   wherein the slurry comprises elastomeric particles in water.

2. The process according to claim 1, wherein the elastomeric particles are selected from the group consisting of polybutadiene particles, poly(styrene butadiene) particles, poly(acrylonitrile butadiene) particles and polybutylacrylate particles and combinations thereof.

3. The process according to claim 1, wherein the elastomeric particles are selected from the group consisting of polybutadiene particles, poly(styrene butadiene) particles comprising at least 50 wt % of units derived from butadiene, poly(acrylonitrile butadiene) particles and polybutylacrylate particles and combinations thereof.

4. The process according to claim 1, wherein the elastomeric particles are polybutadiene particles.

5. The process according to claim 1, wherein the slurry is substantially free of chemical agglomerants.

6. The process according to claim 1, wherein the slurry has a temperature of 40 to 80° C.

7. The process according to claim 1, wherein the flow channel has a Y-shaped cross section, and wherein the valve has a cone-shaped surface that is directed towards the seat.

8. The process according to claim 1, wherein the emulsifying channel section has a first width, as seen in a direction perpendicular to a flow of a fluid to be homogenized, that is adjustable by moving the valve and the seat with respect to each other.

9. The process according to claim 1, wherein the elastomeric particles in the slurry have an average particle size $D_{50}$, as is determined in accordance with ISO 9276-2:2014; and wherein the elastomer agglomerate composition has at most 40 vol % overhomogenized portion, based upon a total volume of the elastomer agglomerate composition.

10. The process according to claim 1, wherein:
    the elastomeric particles are selected from the group consisting of polybutadiene particles, poly(styrene butadiene) particles comprising at least 50 wt % of units derived from butadiene, poly(acrylonitrile butadiene) particles and polybutylacrylate particles and combinations thereof; the slurry is substantially free of chemical agglomerants;
    the slurry has a temperature of 40 to 80° C.;
    the flow channel has a Y-shaped cross section, and wherein the valve has a cone-shaped surface that is directed towards the seat;
    the emulsifying channel section has a first width, as seen in a direction perpendicular to a flow of a fluid to be homogenized, that is adjustable by moving the valve and the seat with respect to each other; and
    the elastomeric particles in the slurry have an average particle size $D_{50}$, as is determined in accordance with ISO 9276-2:2014; and wherein the elastomer agglomerate composition has at most 40 vol % overhomogenized portion, based upon a total volume of the elastomer agglomerate composition.

11. The process according to claim 1,
    wherein the elastomeric particles are selected from the group consisting of polybutadiene particles, poly(styrene butadiene) particles comprising at least 50 wt % of units derived from butadiene, poly(acrylonitrile butadiene) particles and polybutylacrylate particles and combinations thereof;
    wherein the amount of the chemical agglomerants being less than 0.01 wt % with respect to the total of the solids content in the slurry and any chemical agglomerants;
    wherein the slurry has a temperature of 45 to 80° C.;
    wherein the emulsifying channel section has a first width, as seen in a direction perpendicular to a flow of a fluid to be homogenized, that is adjustable by moving the valve and the seat with respect to each other, and wherein the flow channel has an inlet flow channel section having a second width, as seen in the direction perpendicular to the flow of the fluid to be homogenized, that is larger than the first width;
    wherein the elastomeric particles in the slurry have an average particle size $D_{50}$, as is determined in accordance with ISO 9276-2:2014; and
    wherein the elastomer agglomerate composition has at most 30 vol %, underhomogenized portion, and at most 8 vol %, overhomogenized portion, based upon a total volume of the elastomer agglomerate composition.

12. The process according to claim 11, wherein the elastomeric particles are polybutadiene particles.

13. The process according to claim 1, wherein the amount of the chemical agglomerants is less than 0.01 wt % with respect to the total of the solids content in the slurry and any chemical agglomerants.

14. The process according to claim 1, wherein the slurry has a temperature of 45 to 80° C.

15. The process according to claim 1, wherein the emulsifying channel section has a first width, as seen in a direction perpendicular to a flow of a fluid to be homogenized, that is adjustable by moving the valve and the seat with respect to each other, and wherein the flow channel has an inlet flow channel section having a second width, as seen in the direction perpendicular to the flow of the fluid to be homogenized, that is larger than the first width.

16. The process according to claim 1, wherein the elastomeric particles in the slurry have an average particle size $D_{50}$, as is determined in accordance with ISO 9276-2:2014; and wherein the elastomer agglomerate composition has at most 30 vol %, underhomogenized portion, and at most 8 vol %, overhomogenized portion, based upon a total volume of the elastomer agglomerate composition.

17. The process according to claim 6, wherein the slurry has a temperature of 45 to 80° C.

18. The process according to claim 8, wherein the flow channel has an inlet flow channel section having a second width, as seen in the direction perpendicular to the flow of the fluid to be homogenized, that is larger than the first width.

19. The process according to claim 9, wherein the elastomer agglomerate composition has at most 8 vol % over-homogenized portion, based upon a total volume of the elastomer agglomerate composition.

* * * * *